US008805675B2

(12) United States Patent
Kaiser (10) Patent No.: US 8,805,675 B2
(45) Date of Patent: Aug. 12, 2014

(54) REPRESENTING A COMPUTER SYSTEM STATE TO A USER

(75) Inventor: Matthias Kaiser, Mountain View, CA (US)

(73) Assignee: SAP AG, Walldorf (DE)

(*) Notice: Subject to any disclaimer, the term of this patent is extended or adjusted under 35 U.S.C. 154(b) by 1815 days.

(21) Appl. No.: 11/269,784

(22) Filed: Nov. 7, 2005

(65) Prior Publication Data

US 2007/0168922 A1    Jul. 19, 2007

(51) Int. Cl.
*G06F 17/27* (2006.01)
*G06F 9/44* (2006.01)
*G06F 17/28* (2006.01)

(52) U.S. Cl.
CPC .......... *G06F 17/2881* (2013.01); *G06F 9/4448* (2013.01)
USPC ................................... 704/9; 704/1; 704/275

(58) Field of Classification Search
USPC ................. 704/1, 7, 9, 275; 706/925; 705/22, 705/26–28
See application file for complete search history.

(56) References Cited

U.S. PATENT DOCUMENTS

| | | | | |
|---|---|---|---|---|
| 4,736,296 | A * | 4/1988 | Katayama et al. | 704/8 |
| 4,914,590 | A * | 4/1990 | Loatman et al. | 704/8 |
| 4,930,071 | A * | 5/1990 | Tou et al. | 707/4 |
| 4,931,935 | A * | 6/1990 | Ohira et al. | 704/8 |
| 4,974,191 | A * | 11/1990 | Amirghodsi et al. | 704/8 |
| 4,994,967 | A * | 2/1991 | Asakawa | 704/9 |
| 5,167,010 | A | 11/1992 | Elm et al. | |
| 5,193,143 | A | 3/1993 | Kaemmerer et al. | |
| 5,239,617 | A * | 8/1993 | Gardner et al. | 706/11 |
| 5,255,386 | A * | 10/1993 | Prager | 707/5 |
| 5,282,265 | A | 1/1994 | Rohra Suda et al. | |
| 5,369,575 | A * | 11/1994 | Lamberti et al. | 704/9 |
| 5,577,165 | A * | 11/1996 | Takebayashi et al. | 704/275 |
| 5,615,342 | A | 3/1997 | Johnson | |
| 5,748,158 | A | 5/1998 | Kim | |
| 5,794,050 | A | 8/1998 | Dahlgren et al. | |
| 5,802,504 | A * | 9/1998 | Suda et al. | 706/11 |

(Continued)

FOREIGN PATENT DOCUMENTS

| | | |
|---|---|---|
| EP | 0 052 757 A2 | 6/1982 |
| EP | 0 692 765 | 1/1996 |
| GB | 2 153 560 | 8/1985 |

OTHER PUBLICATIONS

Prager et al, "Reason: An Intelligent User Assistant for Interactive Environments," IBM Systems Journal, IBM Corp., Armonk, New York, Jan. 1990, 29(1): 141-164.

(Continued)

*Primary Examiner* — Douglas Godbold
(74) *Attorney, Agent, or Firm* — Fish & Richardson P.C.

(57) ABSTRACT

Operations to represent a computer system state to a user include maintaining a model in a computer system. The model is updated at times and represents a current state of the computer system. The model uses formal-language statements to associate each of several predefined goals with at least one of several predefined actions that can be performed in the computer system to accomplish the associated predefined goal. The operations comprise providing an output to a user regarding the current state of the computer system, the output comprising a natural-language statement generated using at least one of the formal-language statements. A statement generating module may include a text planner, a grammar, a lexicon, a translator or a text post-processor.

20 Claims, 4 Drawing Sheets

(56) References Cited

U.S. PATENT DOCUMENTS

| | | | | |
|---|---|---|---|---|
| 5,819,225 | A * | 10/1998 | Eastwood et al. | 704/275 |
| 5,953,526 | A * | 9/1999 | Day et al. | 717/108 |
| 6,021,403 | A | 2/2000 | Horvitz et al. | |
| 6,050,898 | A | 4/2000 | Vange et al. | |
| 6,101,485 | A * | 8/2000 | Fortenberry et al. | 705/27 |
| 6,157,310 | A | 12/2000 | Milne et al. | |
| 6,286,131 | B1 * | 9/2001 | Beers et al. | 717/125 |
| 6,557,035 | B1 | 4/2003 | McKnight | |
| 6,675,159 | B1 | 1/2004 | Lin et al. | |
| 6,824,049 | B2 | 11/2004 | Lee et al. | |
| 6,950,793 | B2 | 9/2005 | Ross et al. | |
| 7,010,588 | B2 | 3/2006 | Martin et al. | |
| 7,024,348 | B1 * | 4/2006 | Scholz et al. | 703/24 |
| 7,027,974 | B1 | 4/2006 | Busch et al. | |
| 7,158,628 | B2 | 1/2007 | McConnell et al. | |
| 7,225,183 | B2 | 5/2007 | Gardner | |
| 7,328,209 | B2 | 2/2008 | Das et al. | |
| 7,475,133 | B2 | 1/2009 | Nuggehalli | |
| 2004/0010711 | A1 | 1/2004 | Tang et al. | |
| 2004/0102960 | A1 * | 5/2004 | Shimomura et al. | 704/9 |
| 2004/0181390 | A1 * | 9/2004 | Manson | 704/2 |
| 2005/0054381 | A1 * | 3/2005 | Lee et al. | 455/557 |
| 2005/0080628 | A1 * | 4/2005 | Kuperstein | 704/270.1 |
| 2005/0097121 | A1 | 5/2005 | Sally et al. | |

OTHER PUBLICATIONS

Chadha, Vineet, "Book Review: Rob's Guide to Using VMware, by Rob Bastiaansen,"[online] [retrieved on Aug. 22, 2005] <URL: http://www.virtual-strategy.com/article/articleview/538/1/2/>, pp. 1-3.

Kerkez et al., "Incremental Case-Based Plan Recognition Using State Indices," [online]. [Retrieved on Aug. 22, 2005] Retrieved from the Internet: <URL: http://www.cs.wright.edu/~mcox/Papers/kerkez-cox-iccbr01.pdf> pp. 1-15.

"A Guide to GOMS Task Analysis," [online] David Kieras 1994. Retrieved from the Internet <URL: http://www-static.cc.gatech.edu/computing/classes/cs6751_98_fall/handouts/GOMS-Kieras.html>pp. 1-47.

McCarthy, John, "Actions and Other Events in Situation Calculus," [online]. Computer Science Department Stanford University Stanford, Feb. 8, 2002. Retrieved from the Internet URL <http://www-formal.stanford.edu/jmc/sitcalc/sitcalc.html> pp. 1-13.

McCarthy et al., "Some Philosophical Problems From the Standpoint of Artificial Intelligence," [online] Computer Science Dept Stanford University, 1969. Retrieved from the Internet URL < http://www-formal.stanford.edu/jmc/mcchay69/mcchay69.html>. pp. 1-51.

Newell et al., "Human Problem Solving," Prentice-Hall, Inc., 1972, pp. 87-140.

Polya, G., "How to Solve it: A New Aspect of Mathematical Method," Doubleday & Company, Inc., $2^{nd}$ Ed., 1957, pp. v-xvii.

Watson et al., Case-Based Reasoning: A Review, [online] The Knowledge Engineering Review, 1994 [retrieved on Aug. 22, 2005] <URL: http://www.ai-cbr.org/classroom/cbr-review.html >, pp. 1-33.

Amazon.com Frequently Asked Questions [online], SourceForge.net, 2005 [retrieved on Aug. 18, 2005]. <URL: http://www.amazon.com/exec/obidos/tg/browse/-/13316091/ref=pd_ys_iyr/103-5110429-2895835 >, pp. 1-6.

Kubrick and Clarke, screenplay of 2001: *A Space Odyssey.* Knowledge in Speech and Language Processing, [online] Retrieved from the Internet: <URL: http://www.cs.colorado.edu/~martin/SLP/slp-ch1.pdf> pp. 1-18.

Fuchs et al., *Controlled Natural Language Can Replace First-Order Logic* [online] Retrieved on Jul. 20, 2005. Retrieved from the Internet: <URL: http://www.ifi.unizh.ch/groups/req/ftp/papers/ASE99.pdf>.

Sowa, John F. "Controlled English" [online]. John F. Sowa 1999, 2004, [retrieved on Jul. 20, 2005]. Retrieved from the Internet: <URL: http://www.jfsowa.com/logic/ace.htm>.

Schwitter and Fuchs, *Attempto From Specifications in Controlled Natural Language Towards Executable Specifications.* Presented at EMISA Workshop "Natürlichsprachlicher Entwurf von Informationssystemen—Grundlagen, Methoden, Werkzeuge, Anwendungen" May 28-30, 1996. Ev. Akademie Tutzing (pp. 1-15).

"Know the Rules!" [online]. European Business Rules Conference 2005, [retrieved on Jul. 20, 2005]. Retrieved from the Internet: <URL: http://www.eurobizrules.org/speakers/hoppen.htm>.

Smith et al, "Intelligent Help—The Results of the EUROHELP Project," ICL Technical Journal, Oxford, GB, 7(2): 328-361 (1990).

European Examiner G. Del Castillo, Extended European Search Report for Application No. 060217429, dated Jun. 22, 2007, 3 pages.

Abraham Silberschatz et al., "Operating System Concepts," Chapter 4: Processes and Chapter 5: CPU Scheduling, 1994, pp. 97-148.

Jurafsky & Martin, 2000, Speech and Language Processing: An Introduction to Natural Language Processing, Computational Linguistics, and Speech Recognition, Chapter 1, pp. 1-18, Prentice Hall.

Ian Sommerville, "Software Engineering," Seventh Edition, Chapter 4: Software processes and Chapter 6: Software requirements, Pearson Education, 2004, pp. 74-79 and 118-119.

European Examiner G. Del Castillo, EPO Non Final Office Action in App. No. 06 021 742.9, mailed Mar. 6, 2008, 11 pages.

European Examiner C. Lopes Margarido, Extended European Search Report for Application No. 06 024 314.4, dated Apr. 10, 2007, 7 pages.

Extended European Search Report for Application No. 06021742.9, dated Jun. 22, 2007, 3 pages.

EPO Non Final Office Action in App. No. 06 021 742.9, mailed Mar. 6, 2008, 11 pages.

Extended European Search Report for Application No. 06 024 314.4, dated Apr. 10, 2007, 7 pages.

* cited by examiner

REPRESENTING A COMPUTER SYSTEM STATE TO A USER

TECHNICAL FIELD

The description relates to representing a state of a computer system to a user.

BACKGROUND

There is almost always a need for the human user(s) of a computer system to be informed of the current state of the computer system. This is typically done by making some forms of output in the user interface, for example by visual display, audible feedback, or printed hardcopies, to name some examples. However, the state of even a relatively simple computer system may have many different aspects or nuances that could potentially be output to represent the current state. Moreover, in the internal workings of the computer system, such state details are often represented by highly technical or complex terminology.

It takes time for users to learn the computer jargon such that they can sufficiently understand its outputs and react accordingly to them. Also, even for a skilled user the use of complex terminology may pose a risk of misunderstandings. Also, some users do not wish to make the effort necessary to learn the details of computer system communications and may therefore be significantly less efficient in, or avoid altogether, using them.

SUMMARY

The invention relates to representing a state of a computer system.

In a first general aspect, the invention comprises a computer-program product tangibly embodied in an information carrier, the computer-program product comprising instructions that when executed cause a processor to perform operations to represent a computer system state to a user. The operations comprise maintaining a model in a computer system, the model being updated at times and representing a current state of the computer system. The model uses formal-language statements to associate each of several predefined goals with at least one of several predefined actions that can be performed in the computer system to accomplish the associated predefined goal. The operations comprise providing an output to a user regarding the current state of the computer system, the output comprising a natural-language statement generated using at least one of the formal-language statements.

In selected embodiments, providing the output comprises processing several of the formal-language statements. The several formal-language statements may be processed using a grammar. The processing of the several formal-language statements may comprise reordering at least one of them using a planning sequence. The several formal-language statements may be processed using a natural-language dictionary. Providing the output may further comprise post-processing the several processed formal-language statements. The post-processing may comprise substituting an equivalent for at least one of the several processed formal-language statements. The post-processing may comprise joining at least two of the several processed formal-language statements. The post-processing may comprise inserting a connective into at least one of the several processed formal-language statements. The post-processing may comprise replacing a noun in at least one of the several processed formal-language statements with a pronoun. The output may indicate to the user how the computer system came to assume the current state. The natural-language statement may describe at least one of the several predefined actions, wherein the current state was assumed upon performing the described action. The output may indicate to the user another state that the computer system can be caused to assume based on the current state. The natural-language statement may describe at least one of the predefined goals as being possible to accomplish.

In a second general aspect, the invention comprises a computer system. The computer system comprises a model that is updated at times and that represents a current state of the computer system. The model uses formal-language statements to associate each of several predefined goals with at least one of several predefined actions that can be performed in the computer system to accomplish the associated predefined goal. The computer system comprises a statement generating module providing an output to a user regarding the current state of the computer system. The output comprises a natural-language statement generated using at least one of the formal-language statements.

In selected embodiments, the statement generating module comprises a text planner that reorders at least one of the formal-language statements using a planning sequence. The statement generating module may comprise a translator translating the at least one of the formal-language statements into the natural-language statement. The translator may use one selected from the group consisting of: a grammar, a natural-language lexicon, and combinations thereof. The statement generating module may process several of the formal-language statements to provide the output and the statement generating module may comprise a text post-processor that generates the natural-language statement. The text post-processor may perform an action selected from the group consisting of: (a) substituting an equivalent for at least one of the several processed formal-language statements; (b) joining at least two of the several processed formal-language statements; (c) inserting a connective into at least one of the several processed formal-language statements; (d) replacing a noun in at least one of the several processed formal-language statements with a pronoun; and (e) combinations thereof.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
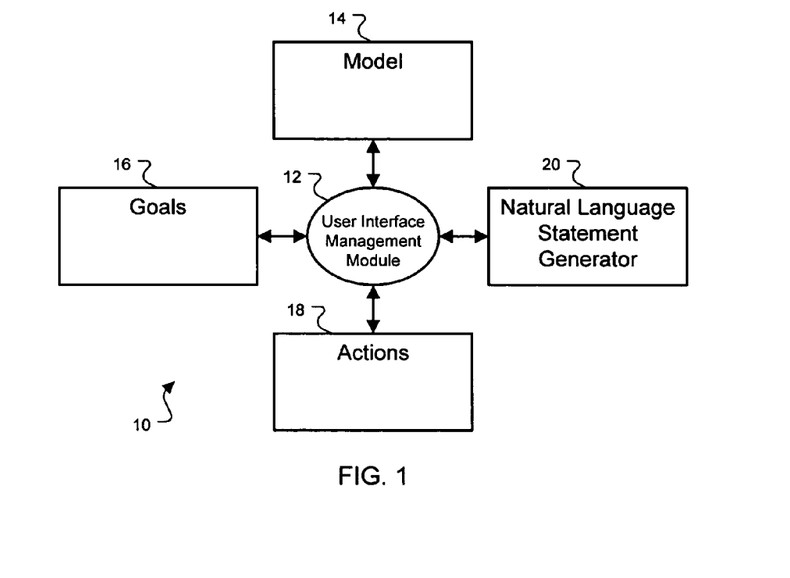
FIG. 1 is a block diagram of a computer system for representing a computer system state to a user using natural language statements.

FIG. 1 shows a computer system 10 capable of representing its state to a user using natural language statements. A user interface management module 12 maintains and at times updates a model 14 representing a current state of the computer system 10. The model 14 uses formal language statements to associate each of several predefined goals 16 with at least one of several predefined actions 18. One or more actions can be performed in the computer system 10, for example by executing instructions in an application program, to accomplish the associated goal(s). An output comprising a natural language statement is provided to the user regarding the current state of the computer system 10. A natural language statement generator (NLSG) 20 generates the natural language statement using one or more formal language statements in the model 14. The output may be presented to indicate a current state so that the user can choose between goals that are possible to achieve from that state. In some implementations, the natural language statement is presented to indicate a state resulting from performing the action(s) associated with a predefined goal, to name two examples. In such implementations, the output may also indicate how the computer system 10 came to assume its current state.

In general, the grammars and lexicons of formal languages are restricted to reduce ambiguity and complexity. A formal language, such as the language of first order logic, may be used to accurately and efficiently represent in the model 14 the current state of the computer system 10. The NLSG 20 translates one or more formal statements in the model 14 into a natural language statement that does not require special training to understand. The natural-language statement may be considered a controlled natural-language statement to the extent it has a restricted grammar and dictionary.

Figure 2:
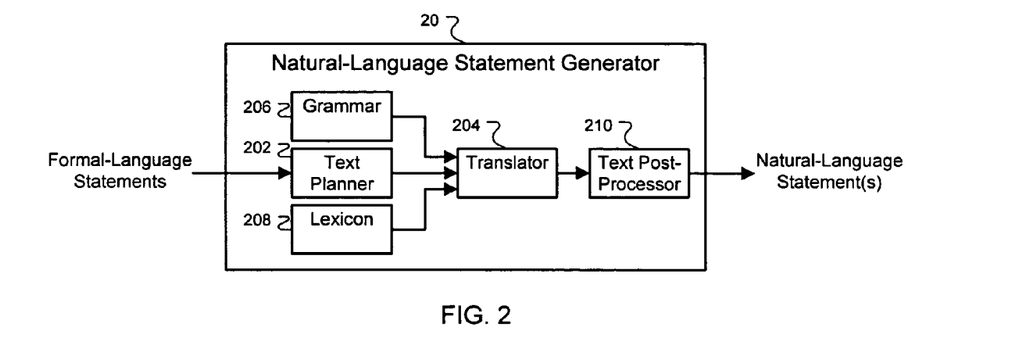
FIG. 2 is a block diagram of components in a natural language statement generator.

FIG. 2 shows an example of the NLSG 20 including several components used in processing formal language statements to generate natural language statements. The components include a text planner 202, a translator 204, a grammar 206, a lexicon 208, and a text post-processor 210.

The text planner 202 receives formal language statements from the model 14 and reorders one or more of the statements using a planning sequence. The planning sequence provides an order for the statements that is coherent and logically organized. For example, the text planner 202 may organize statements representing steps of action sequences in the order in which they occur. As another example, when the model 14 comprises concepts that correspond to real-world items and actors, the text planner 202 may use a prioritizing algorithm that gives more weight to certain concepts, or their properties, than to others, and thereafter may arrange the statements according to the concepts to which they relate.

The translator 204 receives the ordered formal language statements and translates them into natural language statements. For this, the translator 204 may use the grammar 206 or the lexicon 208. The grammar 206 contains grammatical rules of the natural language and can be accessed to provide the acceptable structures of sentences to be formed from the statements, the proper articles for nouns, or the applicable endings for verbs, to name a few examples. The lexicon 208 contains a dictionary or natural language vocabulary of words available to the translator 204. The translator 204 can access the lexicon 208 to verify the spelling of words in the statements or to obtain synonyms for words of a technical jargon.

In some implementations, the natural-language statements generated by the translator 204 are output to the user without further processing. In other implementations, the text post-processor 210 performs post-processing of the statements after they have been translated. The text post-processor 210 transforms the ordered set of natural language statements into a coherent message for the user. The post-processing may include substituting an equivalent statement for one or more of the natural language statements. The post-processing may include replacing a noun with a pronoun. The post-processing may include joining two or more natural language statements with a connective, such as the English language conjunction "and." In addition, the post-processing may include inserting a connective into one or more of the statements.

The following is an example of generating natural language statements using formal language statements. Assume, for brevity, that the NLSG 20 receives four formal language statements that are composed according to a logical notion:

sold(Product 1 ID No.)
returned(Product 2 ID No.)
inquiry(Product 1 ID No.)
meeting(Product 2 ID No.)

The significance of the individual elements of the respective statements is as follows. The first statement indicates that a sale of a product having Product 1 ID No. has occurred. That is, the concept "Product 1 ID No." has been logically associated with the property "sold" in the model 14. When there is a need to keep track of many Product 1 sales, the concept can also be associated with timestamps or other unique identifiers to distinguish the different transactions. Similarly, the second statement corresponds to the return of Product 2 by a customer, the third statement to a customer inquiry about Product 1, and the fourth to a meeting regarding Product 2 that the user should attend.

When the NLSG 20 receives these statements from the model 14, the text planner 202 may begin by determining the order that the subject matters of the respective statements should be presented to the user. For example, the text planner 202 may group the statements according to the product involved. Also, the text planner 202 may give higher priority to returns and meetings than to sales and customer inquiries. As a result, the order of statements provided by the text planner 202 to the translator 204 may be:

returned(Product 2 ID No.)
meeting(Product 2 ID No.)
sold(Product 1 ID No.)
inquiry(Product 1 ID No.)

For clarity, it will be described how the translator 204 can first generate rough natural language statements based on the output from the text planner 202, and thereafter modify and correct these using the grammar 206 and lexicon 208. In particular implementations, the grammar 206 and lexicon 208 may be seamlessly integrated in the operation of the translator 204 so that no intermediate results—the rough natural language statements—are detected before the translator 204 outputs its final results.

The translator 204 may first interpret, in the first reordered statement, the occurrence of the concept Product 2 ID No. and its attribute returned. The same is done for the rest of the statements. The translator 204 roughly translates them into the following statements:

"Product 2 ID No. is returned"
"Meeting about Product 2 ID No."
"Product 1 ID No. is sold"
"Inquiry about Product 1 ID No."

The translator 204 now consults the grammar 206 which results in some modifications. Particularly, because of a predefined preference, the words in past tense, here "returned" and "sold," should be combined with expressions such as "has been". Similarly, the grammar 206 proposes adding verbs to the second and fourth statements according to predefined rules. Upon consulting the lexicon 208, the translator 204 is able to replace the technical product numbers—e.g., "Product 1 ID No."—with the natural language names for the respective products. The resulting statements that are output from the translator 204 to the text post-processor may look as follows:

"Product 2 Name has been returned"
"You have a meeting about Product 2 Name"
"Product 1 Name has been sold"
"An inquiry has been made about Product 1 Name"

The text post-processor 210, in turn, may join two or more statements and insert additional words, to name two examples. Here, the text post-processor 210 joins the first and second statements because they both relate to the Product 2, and similarly the third and fourth statements that relate to Product 1. Thus, the text post-processor 210 in this example will output two statements for the four initial ones. Also, it replaces the later occurrences of the concepts "Product 2 Name" and "Product 1 Name" with the pronoun "it" to avoid awkward repetitions. Thus, the two natural language statements produced by the text post-processor 210 and ultimately output by the NLSG 20 in this example are:

"Product 2 Name has been returned, and you have a meeting about it"
"Product 1 Name has been sold, and an inquiry has been made about it"

In the above example, the natural-language statements are output in written form using a display device. In other implementations, the NLSG can output the statements in audible form using speech synthesizing technology. Thus, natural-language statements can be output visually, audibly, or in any other form by which humans perceive information. An example will now be given about the use of natural-language statements that can be generated along the lines described above.

Figure 3:
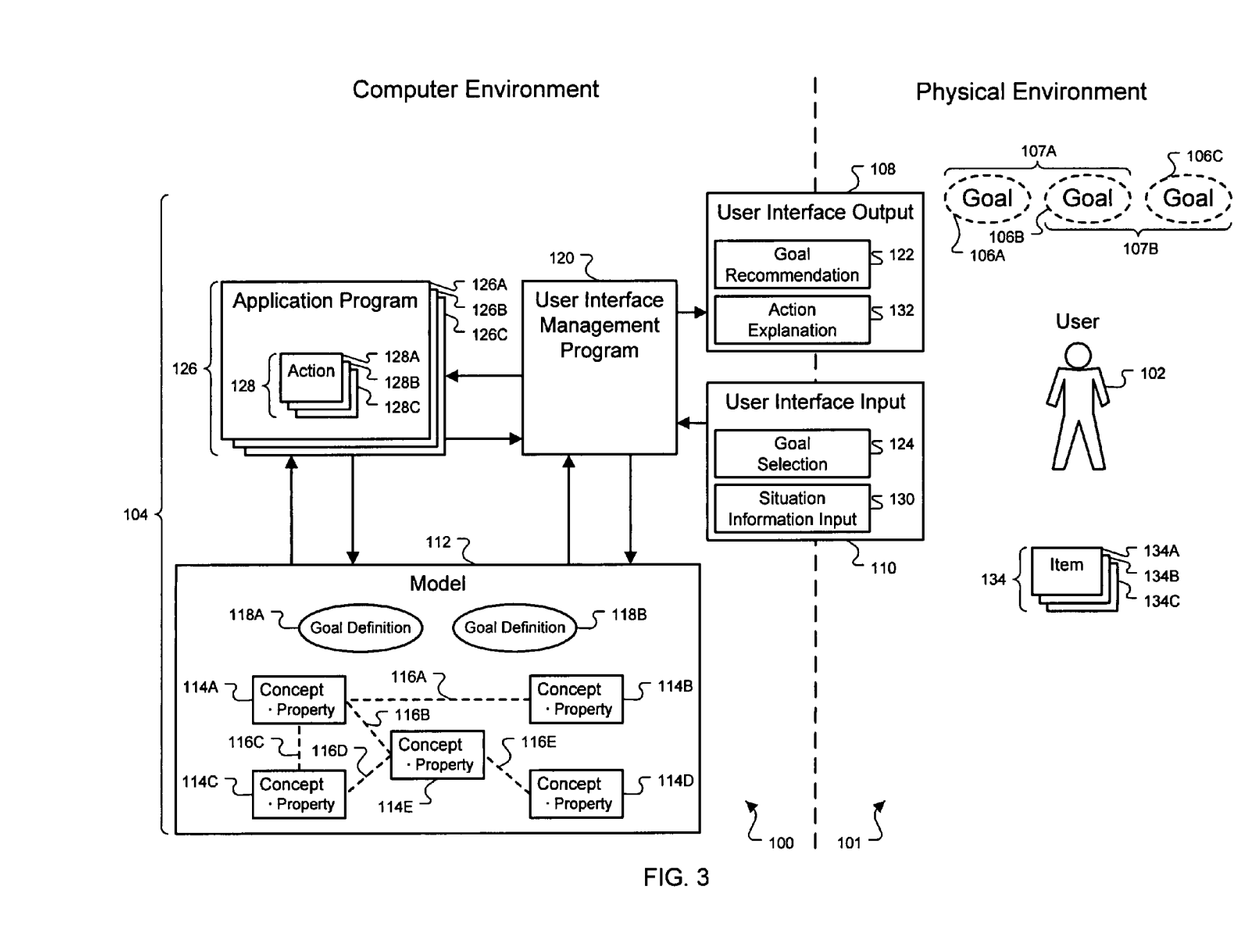
FIG. 3 is a block diagram of a computer environment and a physical environment where a computer system state is represented to a user using natural language statements.

FIG. 3 shows a block diagram of a computer environment 100 that can interact with a physical environment 101 in certain ways. Operations may be performed in the computer environment 100 that support a user 102 in the physical environment 101 in using, or otherwise interacting with, a computer system 104 in the computer environment 100. Particularly, the computer system 104 makes an output containing a natural language statement to the user 102 regarding the current state of the computer system 104. For example, the computer system 104 can recommend to the user 102 one or more goals that have been identified as possible to accomplish, the accomplishment being associated with performing one or more actions in the computer system 104.

The user 102 in the physical environment 101, and in a particular real-world situation, may have one or more goals 106A, 106B, and 106C which can be accomplished using the computer environment 100. Each goal 106A, 106B, and 106C relates to one or more domains 107A or 107B in which the user is knowledgeable. The domains 107A-B include any areas where a person can develop and maintain knowledge, such as financial transactions, business dealings, electronic exchange of information, to name a few examples. The goals 106A-C, in turn, are specific results that can be accomplished in the respective domain(s) 107A-B. For example, goals may consist of validating, authenticating, authorizing, confirming or verifying some item or entity that exists in the physical environment 101. Goals may also consist of combinations of these or other concepts. In short, the goals 106A-C are understandable to the user 102 as intangible concepts in a real-world situation, as indicated by their dashed outlines.

In supporting the user interaction, the computer system 104 may provide one or more user interface outputs 108 that include natural language statements. For example, the computer system 104 may for recommend one or more of the goals 106A, 106B, and 106C to the user. The system 104 may receive one or more user interface inputs 110 upon the user 102 selecting between the presented goals. In some implementations, a computer program product capable of performing these and other functions is implemented to provide a user interface in the computer system 104.

The computer system 104 includes a model that it updates from time to time. The model represents the current state of the computer system 104 using formal language statements. The formal language statements may represent concepts having properties associated with them and by any relationships between the concepts. Particularly, the computer system 104 may maintain a model 112 including the concepts 114A-E, each having one or more properties associated therewith, and the relationships 116A-E, where the model 112 reflects the current state of the computer system 104. For example, the model indicates that the concept 114A currently has the relationship 116A with the concept 114B. In addition, the model 112 includes two or more predefined goal definitions 118A-B. From time to time, there may be executed an instruction in the computer system 104 to evaluate the current state and recommend one or more goals to the user in a natural language statement. The computer system 104 may then analyze the current state using the model 112 and indicate a goal subset as being possible to accomplish in the real-world situation of the user 102. The subset may include all, some or a single one of the goal definitions 118A-B. The goal definitions are predefined and can be updated, added or replaced as needed. Each of them corresponds to one of the goals 106A-C that exist in the domain(s) 107A-B in which the user is knowledgeable.

A user interface management program (UIMP) 120 may be responsible for the processing in the computer system 104 that relates to the model 112, and in particular may output the natural language statements regarding the current system state, such as the subset of the goals 118A-B, as schematically illustrated by a goal recommendation 122. The natural language statements regarding the current system state may be output in a format such as an audible message or a message presented on a display device. In some implementations, the UIMP 120 may make a natural language statement output indicating to the user 102 another state that the computer system 104 can be caused to assume based on the current computer state.

The purpose of the goal recommendation 122 is to inform the user 102 what goal(s) the computer system 104 has identified, based on the current state, as being possible to accomplish. In some implementations, the goal recommendation 122 is triggered by the instruction to evaluate the current state and recommend to the user 102 the goals 118A-B that can currently be accomplished in the computer environment 100. The computer system 104 may identify the subset of the goals 118A-B by analyzing the current state, properties, and relationships of a group of concepts within the model 112 involved in the real-world situation of the user 102.

For example, a user in the process of purchasing items from an online retailer may make a search input indicating a type of product and a price range in which the user is interested. The UIMP 120 at the online retailer adds the search input to the model 112 in the form of the following formal statements:

computer(Product Type)
low_price(Price Range)

The UIMP 120 selects the following concepts, properties, and relationships from the model 112 based on their relevance to the search input:

low_price(Product 1 ID No.)
uses_accessory_x(Product 1 ID No.)

computer(Product 1 ID No.)
accessory_x(Product 2 ID No.)

The UIMP 120 also selects the following goals that may be accomplished given the concepts above and their relevancy to the search input:

purchase(Product 1 ID No.)
purchase(Product 2 ID No.)

The text planner 202 orders the statements in an organized manner according to the planning sequence, such as the following order:

computer(Product Type)
low_price(Price Range)
computer(Product 1 ID No.)
low price(Product 1 ID No.)
purchase(Product 1 ID No.)
uses_accessory_x(Product 1 ID No.)
accessory_x(Product 2 ID No.)
purchase(Product 2 ID No.)

The translator 204 creates a rough translation of the formal statements above by replacing them with natural language statements using the grammar 206 and the lexicon 208, such as the following statements:

"You searched for a product type of computer."
"You searched for a price range including low prices."
"Product 1 Name has a product type of computer."
"Product 1 Name is in a price range including low prices."
"Would you like to purchase Product 1 Name?"
"Product 1 Name uses Accessory X."
"Product 2 Name is an Accessory X."
"Would you like to purchase Product 2 Name?"

The text post-processor 210 processes the statements into coherent messages for the user, combining statements, inserting connectives, and replacing nouns with pronouns, such as in the following statements:

"You searched for a product type of computer and a price range including low prices."
"Product 1 Name has a product type of computer, and it is in a price range including low prices."
"Would you like to purchase Product 1 Name?"
"Product 1 Name uses Accessory X, and Product 2 Name is an Accessory X."
"Would you like to purchase Product 2 Name?"
"Would you like to purchase Product 1 Name and Product 2 Name?"

The user 102 may make a goal selection 124 in the user interface input 110 in response to the goal recommendation 122, such as by selecting "purchase Product 1," "purchase Product 2," or "purchase Product 1 and Product 2." The UIMP 120 receives the goal selection 124 and initiates the performance of one or more actions to accomplish the goal. The action(s) may be performed in any or all of several application programs 126 that are included in the computer system 104. Each of the application programs 126A, 126B, and 126C may include respective actions 128 that are predefined instructions capable of being executed. The model 112 associates each of the goals 118A-B with one or of more of the actions 128 such that, upon the determination that, say, goal 118A can currently be accomplished, the model can be accessed to determine which action(s) of the actions 128 should be performed for accomplishing the goal. For example, the UIMP 120 may cause the application program 126A to execute an action 128A that the model 112 associates with the goal 118A. In some implementations, an action may include a sequence of operations that the model 112 associates with accomplishing a goal. Actions, or several operations of an action, may be performed in more than one application program to accomplish a single goal. Additionally, performing an action may require information that is not currently stored in, or available to, the computer system 104. For example, the action(s) may include a request by the UIMP 120 for a situation information input 130 from the user 102.

The computer system 104 updates the model 112 based on performing any of the actions 128. This may involve eliminating or revising any of the concepts 114, updating or adding properties to any or all of the concepts 114, or adding, modifying or removing any or all of the relationships 116, to name a few examples. For example, the concepts 114, properties and relationships 116 may initially be such that the system 104, upon analyzing them, determines that it is possible to accomplish the goal 118A but not the goal 118B. After performing the prescribed action(s), the concepts 114, properties and relationships 116 may have changed in a way so that it is no longer deemed possible to accomplish the goal 118A in the current state. In contrast, the current state of the model 112 may indicate that it is now possible to accomplish the goal 118B.

The UIMP 120 may make another user interface output 108 including an action explanation 132 in a natural language statement. The action explanation 132 may explain, using information from the model 112, the performance of an action associated with a goal or goals selected by the user 102. The action explanation 132 may be provided at the same time as the action(s) to accomplish the goal are performed, or after finishing the action(s), or by a combination of these approaches.

For example, the user may select the goal, "purchase Product 1," above. The UIMP 120 may request a payment method from the user. The user makes an input that is represented by the following formal language statement:

credit_card(Pay By)

The UIMP 120 selects statements from the model 112 that are relevant to the actions that will be performed, such as the following:

$15(Product 1 ID No.)

The NLSG 20 generates the following natural statement from formal language statements above and outputs them to the user in the action explanation 132:

"You have chosen to pay by credit card."
"Your credit card account will be billed $15 for the purchase of Product 1 Name."

The NLSG 20 may generate natural-language statements in any or all forms, including in audible or written form.

The model 14 or 112 may be a computer-readable structure for holding information in a representative capacity, the information including several concepts, where each concept can have at least one property assigned to it and can have relationships defined with any or all other concepts in the model. Each concept 114 may be a computer-readable structure for holding information regarding an idea, notion or entity, such as an item or an actor. Each property may be a characteristic that can be assigned to a concept.

Figure 4:
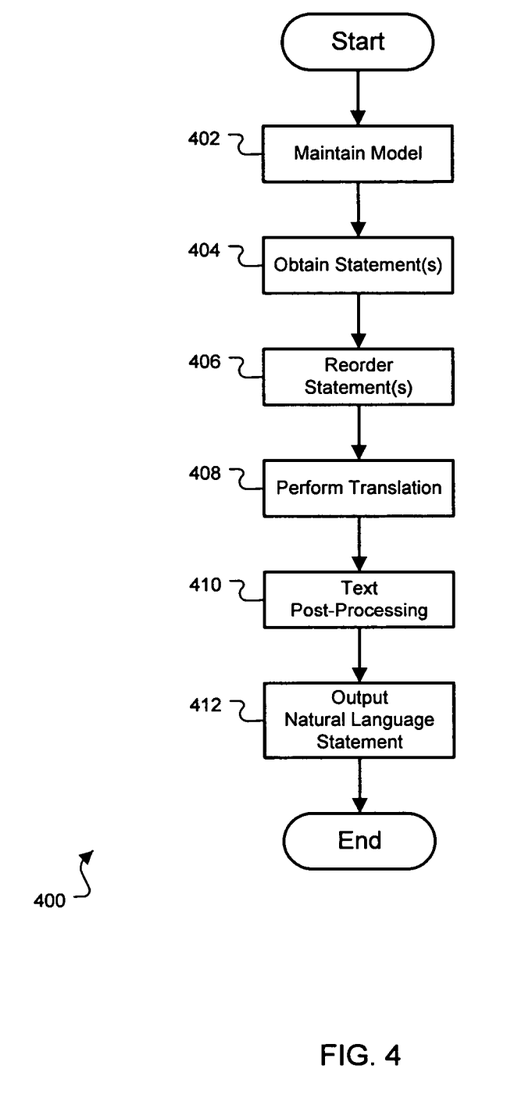
FIG. 4 is a flow chart of exemplary operations that a computer system may perform when representing a computer system state to a user using natural language statements.

FIG. 4 is a flow chart of exemplary operations 400 that the system 104 can perform. A processor executing instructions stored in a computer program product can perform the operations 400. The operations 400 begin in step 402 with the maintaining of a model containing formal language statements that represent the current state of a computer system. The model is maintained throughout the performance of the operations 400 and may be updated at times. For example, the UIMP 120 maintains the model 112 representing the current state of the computer system 104.

In step 404, one or more formal language statements are obtained from the model. For example, the UIMP 120 obtains formal language statements relating to goals 118 that can be accomplished in the computer environment 100 and actions 128 used to accomplish the goals 118.

In step 406, the formal language statements are reordered into a logically coherent sequence. For example, the text planner 202 reorders the formal language statements using a planning sequence.

In step 408, the formal language statements are translated into natural language statements. For example, the translator 204 uses the grammar 206 and the lexicon 208 to translate formal language statements into natural language statements.

In step 410, post-processing of the natural language text occurs. For example, the text post-processor 210 may substitute an equivalent natural-language statement for one or more statements, join two or more statements, insert a connective into one or more statements, or replace a noun with a pronoun in one or more statements.

In step 412, the natural-language statement is output to a user. For example, the UIMP 120 outputs through the user interface output 108 the goal recommendation 122 and the action explanation 132 using natural-language statements.

Figure 5:
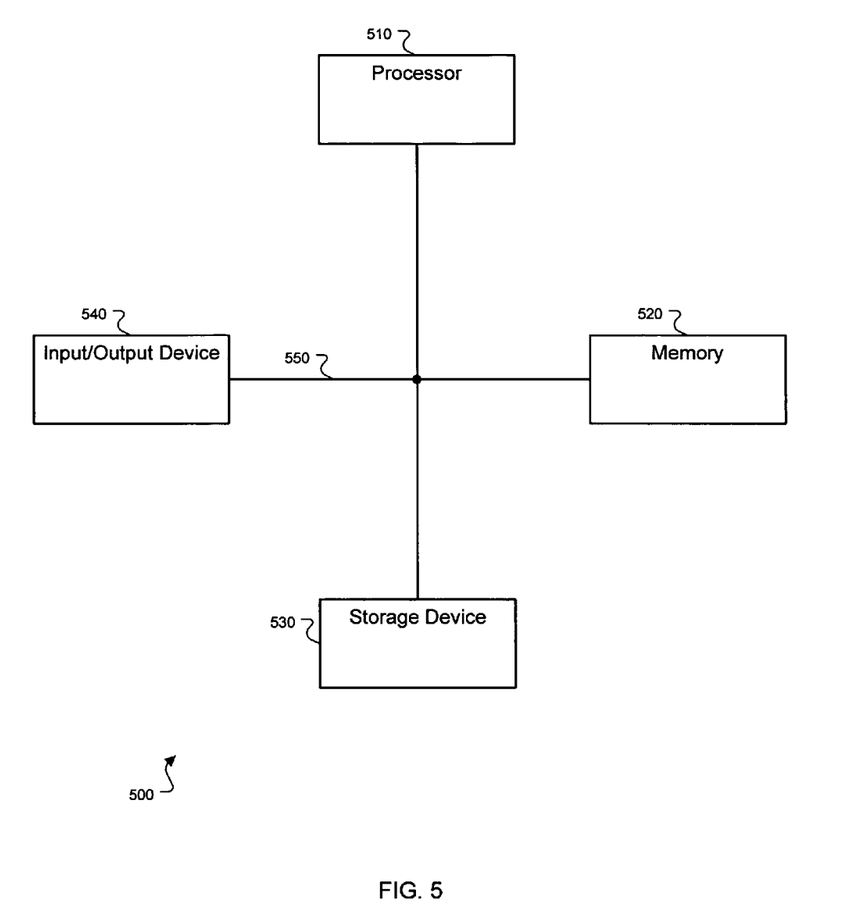
FIG. 5 is a block diagram of a general computer system.

FIG. 5 is a block diagram of a computer system 500 that can be used in the operations described above, according to one embodiment. For example, the system 500 may be included in the computer system 104.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces. The input/output device 540 may be configured for audio input/output.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-sever relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A non-transitory, computer-readable storage device having a computer-program product stored thereon, the computer-program product comprising instructions that when executed cause a computer to perform operations comprising:
updating a model, the model comprising:

information about entities, properties of the entities, and relationships between the entities, wherein the entities are items or actors; and goals related to the entities and associated with performing actions in a computer system, wherein the goals relate to a domain in which a user of the computer system is knowledgeable;

receiving an instruction to recommend one or more of the goals to the user;

in response to the instruction, identifying:

a set of the goals that are achievable based on the current state of the model by analyzing the information about the entities, wherein the identified goals are expressed using formal language; and information about entities associated with the identified goals, wherein the information is expressed using formal language;

translating the identified goals and associated information about entities from formal language to natural language, translating comprising:

receiving formal language statements from the model, and reordering one or more of the formal language statements using a prioritizing algorithm based on concepts to which the formal language statements relate; and presenting the translated goals and associated information about entities to the user in natural language.

2. The storage device of claim 1, wherein translating further comprises replacing formal language terms with natural language synonyms using a natural language dictionary.

3. The storage device of claim 2, wherein translating the identified goals and associated information about entities from formal language to natural language further comprises replacing a natural language noun with a pronoun.

4. The storage device of claim 2, wherein translating the identified goals and associated information about entities from formal language to natural language further comprises joining two natural language statements with a conjunction.

5. The storage device of claim 1, wherein the computer-program product further comprises instructions that when executed cause a computer to perform operations further comprising:

receiving a selection from the user of a goal from among a plurality of presented translated goals; and executing instructions to accomplish the selected goal, wherein the instructions are associated with the selected goal that is part of the model prior to the selection.

6. The storage device of claim 5, wherein the computer-program product comprises instructions that when executed cause a computer to perform operations further comprising:

updating the model to reflection results of executed instructions; and identifying new goals that are achievable based on the updates to the model that reflect the results of executed instructions.

7. A computer-implemented method of identifying goals to a user with natural language, the method comprising:

updating a model, the model being stored in a computer-readable memory structure and comprising:

information about entities, properties of the entities, and relationships between the entities, wherein the entities are items or actors; and goals related to the entities and associated with performing actions in a computer system, wherein the goals relate to a domain in which a user of the computer system is knowledgeable;

receiving an instruction to recommend one or more of the goals to the user;

in response to the instruction, identifying:

a set of the goals that are achievable based on the current state of the model by analyzing the information about the entities, wherein the identified goals are expressed using formal language; and information about entities associated with the identified goals, wherein the information is expressed using formal language;

translating, using at least one programmable processor, the identified goals and associated information about entities from formal language to natural language, translating comprising:

receiving formal language statements from the model, and reordering one or more of the formal language statements using a prioritizing algorithm based on concepts to which the formal language statements relate; and presenting the translated goals and associated information about entities to the user in natural language on a user interface.

8. The method claim 7, wherein translating further comprises replacing formal language terms with natural language synonyms using a natural language dictionary.

9. The method of claim 8, wherein translating the identified goals and associated information about entities from formal language to natural language further comprises replacing a natural language noun with a pronoun.

10. The method of claim 8, wherein translating the identified goals and associated information about entities from formal language to natural language further comprises joining two natural language statements with a conjunction.

11. The method of claim 7, further comprising:

receiving a selection from the user of a goal from among a plurality of presented translated goals; and executing instructions to accomplish the selected goal, wherein the instructions are associated with the selected goal that is part of the model prior to the selection.

12. The method of claim 11, further comprising:

updating the model to reflection results of executed instructions; and identifying new goals that are achievable based on the updates to the model that reflect the results of executed instructions.

13. A computer system, comprising:

a computer-readable memory structure storing a model, the model comprising:

information about entities, properties of the entities, and relationships between the entities, wherein the entities are items or actors; and goals related to the entities and associated with performing actions in a computer system, wherein the goals relate to a domain in which a user of the computer system is knowledgeable;

a programmable system including at least one programmable processor coupled to receive data and instructions from, and to transmit data and instructions to the computer-readable memory structure, the programmable system executing:

a user interface management module operable to:

receive an instruction to recommend one or more of the goals to the user;

in response to the instruction, identify:

a set of the goals that are achievable based on the current state of the model by analyzing the information about the entities, wherein the identified goals are expressed using formal language; and information about entities associated with the identified goals, wherein the information is expressed using formal language;

a natural-language statement generator operable to translate the identified goals and associated information about entities from formal language to natural language, translating comprising:

receiving formal language statements from the model, and reordering one or more of the formal language statements using a prioritizing algorithm based on concepts to which the formal language statements relate; and an interface operable to present the translated goals and associated information about entities to the user in natural language.

14. The computer system of claim 13, wherein the natural-language statement generator further comprises a translator operable to replace formal language terms with natural language synonyms using a natural language dictionary.

15. The computer system of claim 14, wherein the natural-language statement generator further comprises a text post-processor operable to replace a natural language noun with a pronoun.

16. The computer system of claim 14, wherein the natural-language statement generator further comprises a text post-processor operable to join two natural language statements with a conjunction.

17. The computer system of claim 13, wherein the user interface management module is operable to respond to a selection from the user of a goal from among a plurality of presented translated goals by causing an application to execute instructions to accomplish the selected goal, wherein the instructions are associated with the selected goal that is part of the model prior to the selection.

18. The computer system of claim 17, wherein the user interface management module is operable to:

update the model to reflection results of executed instructions; and identify new goals that are achievable based on the updates to the model that reflect the results of executed instructions.

19. The computer system of claim 13, wherein the natural-language statement generator is operable to reorder the formal statements using a grammar.

20. The computer system of claim 13, wherein the goals relate to the purchase of products and the entities are to products for purchase.

* * * * *